Jan. 29, 1957 R. HELMER 2,779,548
MAGNETIC TORQUE TRANSMISSION
Original Filed Oct. 1, 1946 6 Sheets-Sheet 1

Inventor
ROBERT HELMER
By Van Deventer & Shively
Attorneys

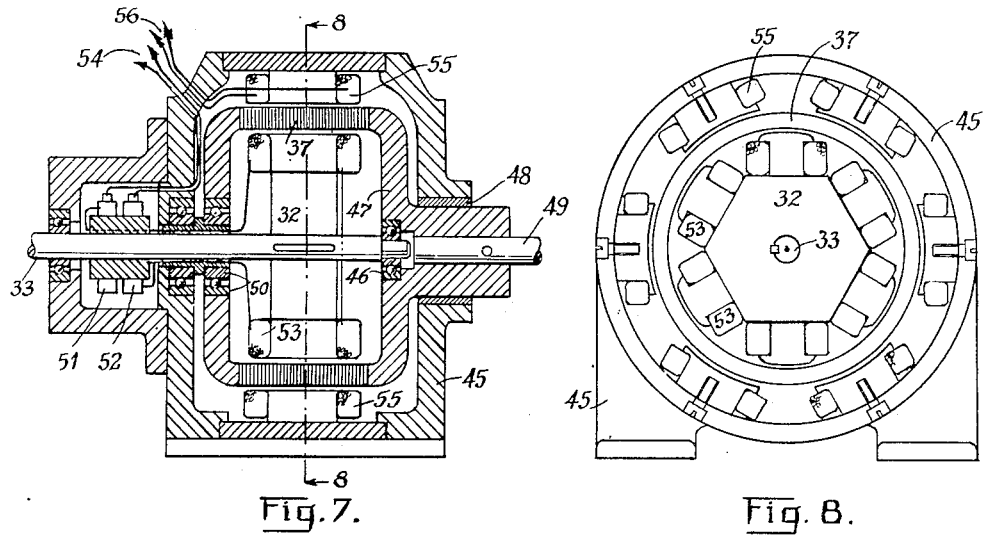
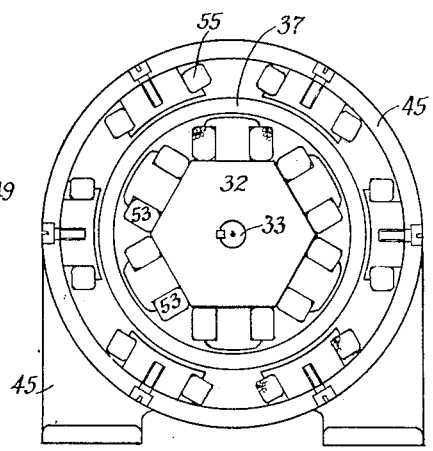
Fig. 7.     Fig. 8.
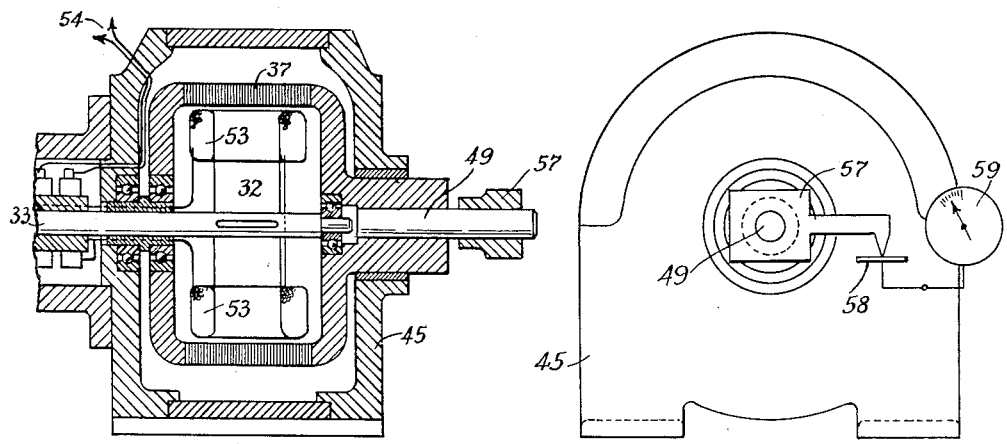
Fig. 9.     Fig. 10.
Inventor
ROBERT HELMER Jan. 29, 1957 R. HELMER 2,779,548
MAGNETIC TORQUE TRANSMISSION
Original Filed Oct. 1, 1946 6 Sheets-Sheet 5

Inventor
ROBERT HELMER
By VanDeventer & Shively
Attorneys

Inventor
ROBERT HELMER

United States Patent Office 2,779,548
Patented Jan. 29, 1957

2,779,548

MAGNETIC TORQUE TRANSMISSION

Robert Helmer, Great Neck, N. Y., assignor to Helmer Transmission Corporation, a corporation of Delaware Original application October 1, 1946, Serial No. 700,569, now Patent No. 2,603,678, dated July 15, 1952. Divided and this application July 10, 1952, Serial No. 298,099

5 Claims. (Cl. 242—75)

This invention relates to improvements in electric devices and more particularly to a torque transmitter in which hysteresis is employed to effect a movement of one member positioned in the magnetic field set up by a second moving member, and the instant application is a division of the co-pending application Ser. No. 700,569, filed October 1, 1946, now U. S. Patent No. 2,603,678, dated July 15, 1952.

An object is to produce an electrical device in which hysteresis is utilized as a working force.

Another object is to produce an electrical device of the class described, in which eddy currents are reduced to a minimum and no use is made of them.

Another object is to reduce the heating effect heretofore present in devices of the class described, where eddy currents are present.

Another object is to produce a device of the class described having rotatable members, one of which is subject to sufficient hysteresis production to operate in synchronism with the other member under load, and to operate at any speed other than synchronism at a greater load, the input speed remaining constant.

Another object is to provide a device of the class described, wherein the driven member, when held against revolution, delivers maximum torque. This is particularly useful when starting under heavy load.

Another object is to provide a device of the class described, including means for reducing eddy current loss to permit operation of the device at a heat loss proportional to the load applied to the driven member.

Another object is to provide an electrical device of the class described having a ring member comprised of laminated, hardened steel having high hysteresis.

Another object is to produce an electrical device of the class described having pole shoe faces in combination with a ring of hard steel so that said pole shoe faces overlie substantially all of the adjacent face of said ring whereby increased efficiency is obtained as more fully hereinafter described.

Another object is to provide a magnetic torque transmission of the construction described, capable of transmitting any desired small or large power and more particularly substantial horsepower (say 5 horsepower and over), and yet be of reasonable size and cost.

Other objects and advantages will be apparent from the following specification in which, by way of illustration, preferred embodiments of the device will be disclosed. It will be understood, however, that these disclosures are merely illustrative and not limitative of the invention, and that details of construction can be widely varied once the main inventive concept herein disclosed is understood. The invention is therefore that broadly defined by the appended claims.

In the accompanying drawings:

Fig. 7 is a longitudinal sectional view of a machine constituting a modification of that shown in Figs. 3, 4.

Fig. 8 is a sectional view on the line 8, 8 of Fig. 7.

Fig. 9 is a longitudinal sectional view of another machine constituting a modification of that shown in Figs. 3, 4.

Fig. 10 is an end view of the machine Fig. 9 applied to a dynamometer.

Figure 3:
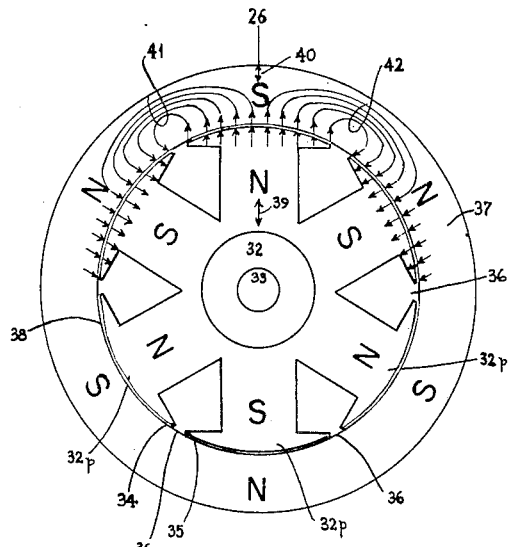
Figs. 3 and 4 are diagrammatic sectional views of a machine embodying the invention.

Before describing physical embodiments of the invention, it is desirable to point out that in all electrical rotating machines there are what are commonly called "core losses." This term "core loss" is employed to designate the total internal loss in the rotating apparatus due to the combined effect of eddy currents and hysteresis. But, as the losses due to the former are governed by laws totally different from those applicable to the latter, special analysis is required to distinguish one from the other.

*Eddy currents*

Since a varying magnetic field induces an E. M. F. in every path that links the flux, such an E. M. F. will, in general, cause a flow of current in the magnetic materials comprising the magnetic circuit. Such currents, called eddy currents, or Foucault currents cause $I^2R$ losses.

If the mass of iron in an armature pole is so disposed that, as it rotates, the distribution of the lines of force in the narrow field (air gap) between the armature and pole piece is being continually altered, then, even though the total amount of magnetism of the field remains unchanged, eddy currents will be set up in the pole piece, causing heat which performs no useful work.

The eddy current loss, per cycle, is directly proportional to the frequency and the total eddy current loss is proportional to the square of the frequency. In electrical machinery these eddy currents are often responsible for more than 50% of the total core losses.

The energy generated by eddy currents is dissipated in heating the iron. The paths of the eddy currents are more or less indeterminate, being in general dependent upon the shape of the iron with respect to the direction of the flux.

*Hysteresis*

Hysteresis is that quality in iron which causes the lagging of the induction behind the magnetic forces. It causes a loss when the direction of induction is reversed and results in the heating of the iron. It increases in direct proportion to the number of reversals, and approximately as the 1.6th power of the maximum value of the induction in the iron.

In a motor, when the iron pole pieces of an armature are caused to rotate past stationary field poles, hysteresis results and appears as a counter-torque. That is, a torque counter to the direction of the rotation of the armature. This counter-torque is produced by the unwillingness, so to speak, of the iron molecules to be continually orientated and re-orientated, and is used in carrying out the invention herein disclosed.

The established practice to minimize hysteresis loss is to select a soft iron or steel with the highest permeability. An iron with a high B/H curve or a high permeability has a very small retentivity and coercive force, therefore the molecular friction is small. In prior art devices where "steel" is mentioned, it usually has characteristics that will reduce hysteresis to a minimum as the hysteresis is not used to perform useful work.

The area of a hysteresis loop is proportional to the hysteresis loss. It is shown that thin laminations have higher hysteresis losses per unit weight than thick sheets, and the finer the grain structure, the greater the hysteresis loss.

The hysteresis loss per cycle is independent of the frequency; i. e. the total hysteresis loss is directly proportional to the frequency.

Magnetic analysis of iron show that there is a relation between mechanical and magnetic properties. There is a very striking relation between hysteresis and mechanical properties, such as hardness and tensile strength. By plotting Brinell hardness and the tensile strength against the product of the maximum induction and coercive force ($Bm \times Hc$), this product is found to be approximately proportional to the hysteresis loss.

The magnetic properties of a material are often greatly affected by heat treatment. A quench produces mechanical strains in the material which, in general, lowers the magnetic quality by causing a decrease in the permeability and an increase in the coercive force and the hysteresis loss. It increases HC.

Bearing the foregoing relationship in mind, the inventive concept herein disclosed is that of reducing eddy currents to a minimum, while at the same time provision is made to increase hysteresis to a maximum. This, in any given device may be attained by selecting a suitable steel, such as a high carbon steel and hardening it, and using it in the form of thin laminations of fine grain structure, these forming a magnetic circuit with the highest hysteresis possible. By this means it is possible to make use of the hysteresis (heretofore a loss) as a means of transmitting torque from one member to another while reducing eddy current losses to a minimum.

It will be observed that former practice has been deliberately avoided in the constructions to be presently described herein, the invention utilizing magnetic phenomena (hysteresis) in a new and useful way.

By way of illustration, the invention will be applied to a magnetic torque transmission, although it will be obvious that it can be applied to many other electrical devices used for a wide variety of purposes.

In such torque transmissions, there is a driving member usually connected to a source of power such as an electric motor, and a driven member connected to the work, for example, a printing press or the like.

The driving and driven members are mounted to rotate one within the other in the transmissions herein described. The driving member is located inside the driven member and carries the field windings and the driven member is ring-shaped. It will be obvious that the position of the driving and driven members may be reversed from the position herein described, in that the driving member may be a body of steel revolving within the driven member, which would then be the external member of the pair carrying the field windings.

*Prior art devices*

Reference will now be made to some prior art devices as some of these have parts that pictorially resemble parts used in the instant invention although none of them embody the inventive concept disclosed.

These devices often comprise magnetic couplings and include a revolvable 2 pole electromagnet, the poles of which are spaced adjacent a revolvable 2 pole permanent magnet. Usually the electromagnet is the driving member and the permanent magnet is the driven member, and the load is connected to the driven member.

In some cases, both the driving member and the driven members are permanent magnets.

Such magnetic couplings have been used in connection with driving fans, particularly cooling fans in refrigeration units for household use, where a small amount of coupling torque is necessary.

While it is true that the permanent magnets in such devices are made of hard steel and have high hysteresis, it will at once be apparent that with such devices the driving and driven members must be in step with each other, as the operation of such devices is dependent upon the direct magnetic pull of the poles of the driving member on the unlike poles of the driven member, and therefore the driving and driven members must be in synchronism; if at any time the load is sufficient to cause slip, the driven member will no longer be subject to sufficient magnetic attraction. This is the same phenomena as that which occurs in a synchronous motor when overloaded.

These devices are usable only when a small amount of power (usually less than 1/20 horsepower) is to be transmitted, and are limited to such fractional horsepower uses, because if any attempt is made to increase the size or the strength of the permanent magnets to handle greater loads, the size and cost of the device becomes prohibitive.

As an example, it might be pointed out that a magnetic transmission of this type capable of handling 5 horsepower would be several times the size and weight of an ordinary 5 horsepower motor, with which it would be used, and could only run in sychronism as previously referred to.

So that, while it will be seen that devices such as described do incorporate a magnetic driven member of hard steel, they do not operate on the principle herein disclosed, and do not have the advantages of the present invention; and cannot be used for the same purpose.

A second class of prior art machine to which reference will now be made are termed "eddy current" machines. The construction of these machines pictorially resembles the instant invention, which, however, clearly distinguish therefrom in many respects as hereinafter pointed out.

Figure 1:
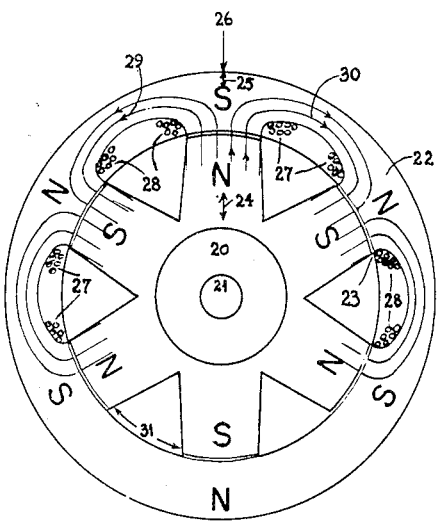
Figs. 1 and 2 are diagrammatic sectional views of a prior art machine.
Figure 2:
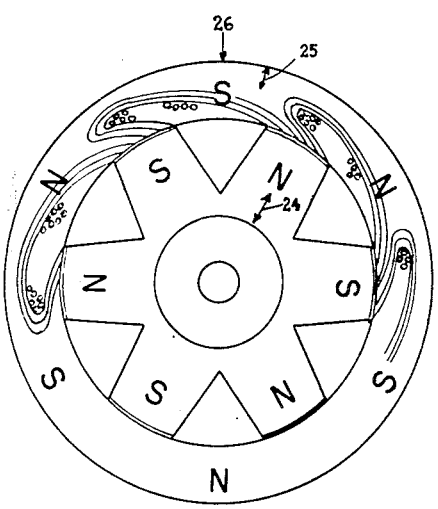

In order that these distinctions between the instant invention and the prior art may be clearly understood, reference is now made to Figs. 1 and 2, which show diagrammatically elevational longitudinal sectional views of an eddy current transmission of a well known type.

Referring to Fig. 1, the numeral 20 denotes the driving member of the device supported on the shaft 21, connected to a source of power such as an electric motor or the like (not shown).

The driving member may have any equal number of poles N, S, and, for the sake of illustration, a standard 6 pole arrangement is shown. The driving member is usually constructed of iron.

Each pole has a field winding (not shown) and the windings are connected to a suitable source of direct current in any known manner so that the driving member may be energized while rotating to have alternate N, S poles as shown.

A driven member 22 is comprised of a ring of magnetic material, such as iron or steel, having sufficiently low electric resistance to the flow of eddy currents to enable same to be set up by flux generated in the driving member.

The driven member is supported to rotate about the path of travel of the driving member 20, and a small air gap exists between th driving member and the inner surface 23 of the driven member hereinafter sometimes termed the ring.

It will be understood that the ring is suitably supported on a spider which has a shaft (not shown) axially aligned with the driving shaft 21.

Assuming the driving member to be energized, and rotating in a clockwise direction, and that the driving and driven members are lined up so that the points 24 and 25 thereon are in line with the vertical axis 26 of the machine as shown in Fig. 1, induced currents will be set up in the ring 22, and may be assumed to flow in planes perpendicular to the plane of the paper on which the drawings appear. The currents shown at 27 flow away from the observer and the currents shown at 28 flow towards the observer.

These induced currents are caused by the flux indicated at 29 and 30 which flows through the body of the ring 22 from the poles N, S of the driving member.

Assuming that the driving and driven members rotate so that the points 24 and 25 thereon move from the positions shown in Fig. 1 to those shown in Fig. 2, it will be apparent that the flux lines 29, 30 are dragged through the body of the ring as the poles N, S, rotate. This shifts the paths 27, 28 of the induced currents in the body of the ring, thus giving rise to eddy currents which act to couple the ring 22 to the driving member 20 so that a torque is generated between the members.

The torque (twisting effort) in foot pounds being $$T = \frac{5250 \times \text{horsepower of output shaft}}{\text{R. P. M. of output shaft}}$$

It will immediately be noted that the face of the pole pieces N, S in devices of this kind do not substantially cover the inner face of the ring, comparatively wide gaps such as 31 being therebetween. In fact, the poles are often tapered to increase these gaps to cause a greater change in flux distribution to produce higher eddy currents. These eddy currents are induced by the sweeping of successive electromagnetic poles past given points on the ring in which the eddy currents are induced, due to relative movement of the poles and the ring, which must occur to produce these currents and any torque.

It will also be observed that if any hysteresis is present in the structure shown in Figs. 1 and 2, that it is parasitic so far as any coupling (torque) effect is concerned, being opposed to, and tending to nullify the eddy current effect. This will be evident from a discussion of the hysteresis phenomena to be presently presented in connection with the improved device forming the subject matter of this application.

The device shown in Figs. 1 and 2 is readily recognized as an adaptation of a squirrel cage motor in which both the "Rotor" corresponding to 20, Figs. 1 and 2, and the "frame" corresponding to 22, Figs. 1 and 2, are allowed to rotate at variable relative speeds.

In the squirrel cage motor, cage bars (usually of copper), are used in the frame and the rotation of the motor produces a revolving primary magnetic field.

In the machine shown in Figs. 1 and 2, the principle of operation is the same, but the eddy currents in the frame do not have the directed low resistance circulation provided by the squirrel cage bars just referred to. The eddy currents circulate in the body of the ring 22.

It is evident therefore, that when "steel" is used in the ring of the eddy current devices shown in Figs. 1 and 2, that this "steel" is of such characteristics as to form a low resistance path for the induced eddy currents, and that this "steel" cannot therefore be of the same characteristics as the steel used in the device hereinafter disclosed and forming the subject matter of this application.

An analysis of the device shown in Figs. 1 and 2 will immediately reveal that the torque will increase with the output speed up to some given point depending on the structural details of the machine, but that thereafter the torque will drop off. In other words, as the sweep rate of the poles increases above a predetermined rate, the torque diminishes.

It will also be noted that in a machine of this description the driving and driven members can never run in synchronism, slip being present and necessary under any condition of load to provide torque.

The loss due to slip is evidenced in the formation of heat due to the eddy currents produced in such machines. Such losses do not occur in the improved device to be presently described.

In the prior art device being discussed, if the full load speed of the A. C. driving motor is 1760 R. P. M., and the slip 50 R. P. M., the output speed at normal load will be 1710 R. P. M., the clutch slip being slightly less than 3%. In the case of a full load motor speed of 1150 R. P. M., the slip in terms of motor speed would be approximately 4.5% and the output speed would be 1100 R. P. M.

In Figs. 1 and 2 the flux lines 29, 30 and the paths 27, 28 are only shown in connection with three of the poles of the member 20, but it will be understood that they exist in connection with all the poles of said member.

Description of embodiments of the instant invention

Figure 4:
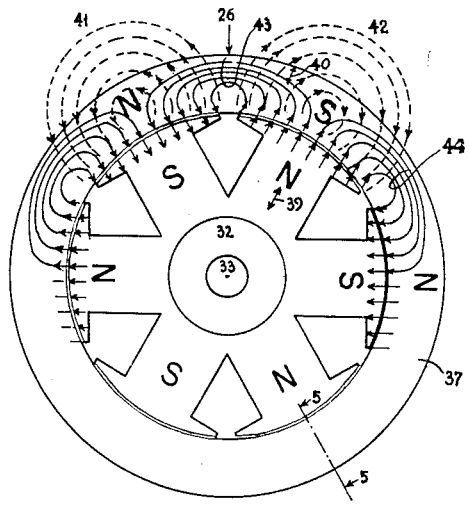

Figs. 3 and 4 show diagrammatically, elevational longitudinal views of a torque transmission embodying the invention. These views correspond to views of the prior art machine shown in Figs. 1 and 2.

Referring to Fig. 3, the numeral 32 denotes the driving member of the device supported on the shaft 33 connected to a source of power such as an electric motor or the like (not shown).

The driving member may have equal number of poles N, S, and for the sake of illustration, a standard 6 pole arrangement is shown. The driving member is usually constructed of soft iron.

Each pole has a field winding (not shown), and the windings are connected to a suitable source of direct current in any known manner such as that hereafter shown and described in connection with other embodiments of the invention, so that the driving member is energized while rotating to have alternate N, S poles as shown.

Each pole has a pole shoe 32p. These pole shoes extend circumferentially round the path of travel of the driving member and the tips such as 34, 35 of adjacent pole shoes are close together so that the gap 36 between adjacent pole shoes is reduced to a minimum.

By providing pole shoes that cover substantially the inner face of the driven member or ring 37, to be presently described, it will be seen that the maximum number of magnetic lines of force can flow perpendicularly across the air gap 38 between the pole shoes 32p and the ring 37, and that when relative motion takes place between the pole shoes and the ring, maximum hysteresis is produced in the ring which would not occur if large gaps were employed at 36. Thus, considerable increase in efficiency is obtained by reason of the arrangement of the pole shoes as described.

Figure 5:
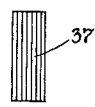
Fig. 5 is a cross-sectional view on the line 5, 5 of Fig. 4.

The ring 37 is made up of a plurality of laminations of suitable steel as defined later herein. The planes of the laminations extend transversely across the path of the eddy currents, as shown in Fig. 5, in order to prevent any flow of eddy currents and these currents are therefore negligible, if they exist at all, and play no part in the operation of the device.

The driven member or ring 37 is suitably supported on a spider or the like, which has a shaft (not shown) which is axially aligned with the driven shaft 33.

Assuming the driving member 32 to be energized and rotating in a clockwise direction, and that the driving and driven members are lined up so that the points 39 and 40 thereon are in line with vertical line 26 as shown in Fig. 3, flux lines will extend from the N to S poles of the driving member via ring 37. Sets of such lines are indicated at 41 and 42.

Assuming that the driving and driven members rotate so that the points 39 and 40 move from the position as shown in Fig. 3 to that shown in Fig. 4, it will be apparent that the direction of the flux lines 41—42 will be reversed as shown at 43—44 in Fig. 4. This shift in the direction of the flux lines causes hysteresis in the ring 37, which appears as a driving torque; that is, a torque in the direction of rotation of the driving member 32. This torque is produced by the unwillingness, so to speak, of the iron molecules in the ring 37 to be continually orientated and reorientated. The result is that the ring 37 tends to rotate along with the driving member 32.

Since the magnetic induction of the selected steel is low, being equal to the permeability U times the magnetizing force H, and consequently having a high reluctance, the shape of the pole shoes 32p is such as to increase the magnetic induction and decrease the reluctance as much as possible. As shown in Figs. 3 and 4, the pole shoes 33 overlie almost the entire inner circumference of the ring 37, and the pole shoe gaps 36 are relatively small. The reason for this has already been pointed out, but may be amplified by stating that the induction is equal to the number of perpendicular lines of force per unit area of cross section of magnetized material. Thus, the shoes 33p are made as long as possible so that the area of the ring 37 opposite the shoes is as great as possible, making the greatest number of lines of force perpendicular to the flux. This also reduced the reluctance.

It will be observed that if any eddy currents are present in the structure shown in Figs. 3 and 4, that they are parasitic and do not produce any torque.

It will also be observed that if the driving member 32 is rotated, ring 37 will also rotate in synchronism therewith. This synchronous condition will be maintained even if force is applied to the shaft of the ring 37 in a direction counter to the direction to the rotation provided that this force (dynes) be of smaller magnitude than the work which would be required (in dynes) to reorient the molecules of iron in the ring 37.

As a further example, assume the driven member 32 to be coupled to a prime mover whose speed is 1800 revolutions per minute and with a certain excitation; assume a load to be applied to the shaft of ring 37, and it slowed to a speed of 1620 R. P. M. or 90% of the speed of the member 32. Assume the device had 6 poles as shown in Figs. 3 and 4. Then each of the poles in the rotor would cause the molecules of iron in the ring 37 to be oriented and reoriented 6 times for each revolution, and since the ring is going 180 revolutions slower than the rotor, the lines of force in the ring 37 would go through 6,480 magnetic cycles. This cyclic change required work to be done, and this work was caused by the load applied to the shaft of the ring 37 to slow it to 90% of the speed of member 32. The reason the ring decelerates to the speed of 1620 R. P. M., is because at that speed the "hysteresis loss" in the ring in watts, or other unit of work is equal to the applied load in the same units. In other words, the "hysteresis loss" is in equilibrium with the load.

Further, suppose a large load were applied to the ring shaft, such that the ring 37 now ran at 900 R. P. M., then the lines of force in the ring would have gone through 36×900, or 32,400 magnetic cycles. The "hysteresis loss" being proportional to frequency, or speed, would be five times greater than in the above example. Stated differently, at a ring speed of 900 R. P. M., the D. C. excitation being the same, the output torque would be five times greater than it was at 180 R. P. M.

If a still larger load be applied to the ring shaft so that the ring slowed to 10% of the rotor speed, or 180 R. P. M., then the induction in the ring would have gone through 1630×36, or 58,320 magnetic cycles, and in this case the "hysteresis loss" would be nine times greater.

It is seen that in this device the torque transmitting capacity increases as the output speed decreases, and were it possible to select a steel with an ideal hysteresis loop, the torque increase would be doubled as the speed was halved, thereby producing a constant horse-power output. However, since it is impossible to obtain a steel with these ideal charatceristics, the same desired result, namely a constant H. P. is readily accomplished by the simple expedient of automatically varying the excitation current with ring speed.

With this hysteresis torque transmission, an electric motor, gasoline engine or other suitable prime mover may be operated at its normal speed, producing its maximum rate of H. P. The prime mover would then be coupled directly to the driving member 32 of the transmission and the ring 37 of the transmission connected to the load. If the prime mover were an induction motor running at 1750 R. P. M., and if the load were such that it required 10 H. P. at 175 R. P. M., and coils of the rotor were energized to a point where the shaft of the ring member 37 were turned with this load at 175 revolutions per minute, then the torque delivered to the load would be 300 foot pounds, which, at this speed, would produce 10 H. P.

It is seen from the above, that, with this invention, a prime mover can be operated at its ideal working speed and the maximum amount of torque will be developed in the transmission to take the load from a state of rest and gradually accelerate it to run at any desired speed.

A commercial form of the device shown diagrammatically in Figs. 3 and 4, and capable of transmitting several horsepower, has approximately the following dimensions, from which the savings in space and weight made possible by this invention can be compared with prior art devices.

Overall length 16"
Overall width 20"
Area of shafts 1½"
Dimension of ring 37 as shown in cross section in Fig. 5
    O. D. 19"
    I. D. 17"; thickness—3"
Number of pole pieces—8
Approximate dimensions of each coil on a pole piece
    4" x 5" x 3" long
Number of turns in each coil 1386
Resistance 10.5 ohms per coil
Width of air gap 38—.010"
Width of gaps 36—¼"

The flux lines 41 and 42 are only shown in connection with three of the poles of member 32 in Figs. 3 and 4, but it will be understood that they also exist in connection will all the poles of said member in a manner that will be obvious. It will be observed that the path of the flux lines such as 41, 42, lies entirely within the steel ring 37 which is of such proportions as those given above to have a magnetic reluctance equal or less than the magnetic reluctance of the magnetizing circuit, such as any pair of pole pieces connected by flux lines 41, Figures 3 and 4.

It will be understood that the dotted lines 41, 42, Figure 4, do not represent the path of the flux but are merely lead lines to indicate the flux lines within the steel ring 37 and how the latter shift during the operation of the device.

Figure 6:
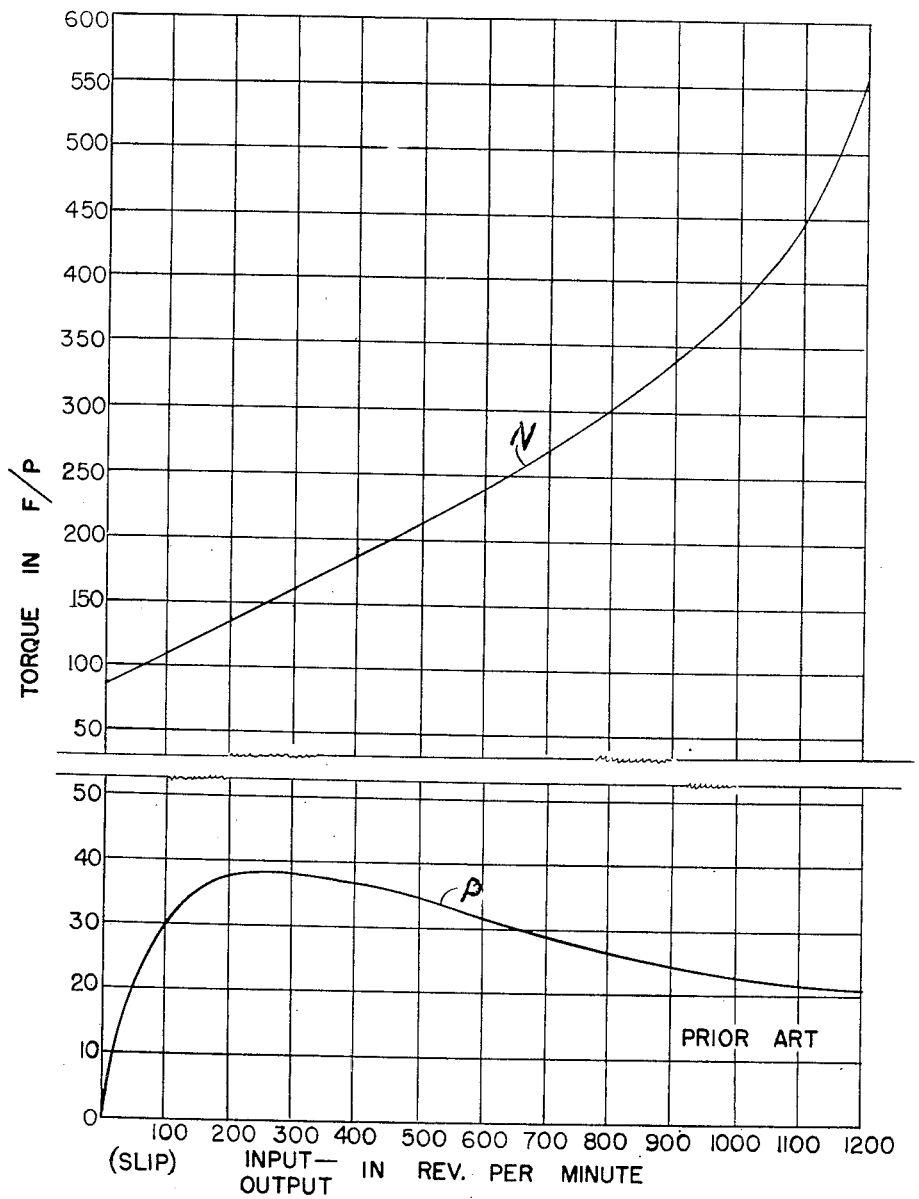
Fig. 6 is a torque diagram showing torque produced by the machines shown in Figs. 1, 2 and 3, 4.

Fig. 6 shows torque curves produced by two machines having the same number of poles and the same number of ampere turns, and constructed as near alike as possible. The curve P is produced by the eddy current prior art machine as described in connection with Figs. 1 and 2 hereof, and curve N is produced by the improved device employing hysteresis as described in connection with Figs. 3 and 4 hereof.

By comparing these two curves it becomes apparent that in the prior art machine the torque decreases as the difference is speed (slip) between the input and output increases, and that with applicant's machine the torque increases as the difference in the speed between the input and output increases.

A further study of Fig. 6 will reveal that the prior art machine can never operate at synchronism as it would produce no torque, whereas applicant's machine operating at synchronism would deliver a torque of approximately 90 foot pounds. In other words, applicant's machine running at synchronism will produce more torque than the prior art machine at its maximum.

Fig. 6 also reveals that at a slip speed of 1200, the prior art machine delivers approximately 20 F. P., while applicant's machine produces over 550 F. P. torque.

Fig. 7 is a longitudinal, sectional view of a machine embodying the features disclosed in Figs. 3 and 5, and shows at 45 a frame in which driving shaft 33 is mounted in suitable bearings to rotatably support the driving member and its exciting coils 53 therein. One of the bearings for the shaft 33 (such as 46) is supported in the spider or framework 47 carrying the driven member or laminated ring 37. This ring and its spider framework are supported in a bearing 48 in the frame 45, and the spider is connected to a shaft 49 which is the driven shaft of the transmission (and is illustrative of a shaft for the ring 37 of Figs. 3 and 4, where this shaft is omitted). The opposite end of the spider 47 is supported in the bearing 50 on the shaft 33.

Mounted to rotate with, but insulated from shaft 33, are the conducting rings 51, 52, which are in turn connected by suitable conductors extending through shaft 33 to the coils 53 of the driving member. These rings have the usual contact brushes which are connected by conductors 54 to a source of direct current.

Spaced around the outer periphery of the ring 37 are the brake coils 55, suitably supported on the frame 45 and these coils are connected by conductors 56 to a suitable source of current via a control apparatus to be presently described.

As shown in Figs. 9 and 10, the brake coils 55 can be omitted when not required. For example, when the device is used as a dynamometer wherein the output shaft 49 is connected to a dynamometer arm 57 resting upon the platform 58 of the scale 59.

Referring to Fig. 10, if the shaft 49 is tending to rotate clockwise under torque developed between the ring 37 and the member 32, the scale 59 will measure this torque which measurement will be a measure of the power applied to the driving shaft 33 of member 32.

The device in Fig. 9 may also be used as described in connection with Fig. 14.

Figure 11:
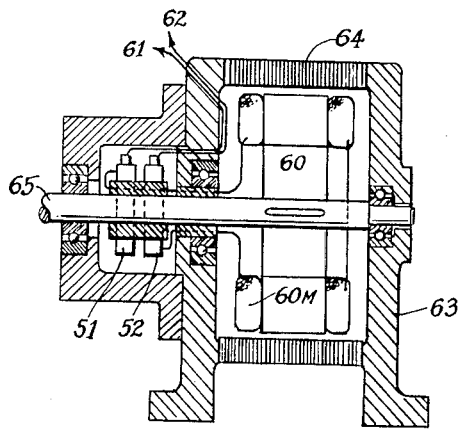
Fig. 11 is a longitudinal sectional view of another machine constituting a modification of that shown in Figs. 3 and 4.

In Fig. 11 is shown a simplified form of the device described in connection with Figs. 3 and 4 and 7–9 inclusive. Said Fig. 11 discloses a device employing the improved torque transmitter for applying a constant let-off tension on a roll of paper as it is being printed on a printing press.

In this embodiment of the invention, a rotatable member 60, corresponding in constructional details with the driving member 32 previously described, is provided with exciting coils which are connected via the rings 51 and 52 with a suitable control system (via wires 61 and 62) to be presently described in connection with Fig. 17.

The framework 63 has mounted thereon a stationary ring member 64 which may be in all respects (except for its mounting) constructed the same as the driven member 37 described in connection with Figs. 4 and 5.

It will be observed that the ring member 64 in Fig. 11 is stationary at all times, and that the shaft 65 carrying the rotatable member 60 is supported in suitable bearings in the framework 63 and revolves therein.

Figure 12:
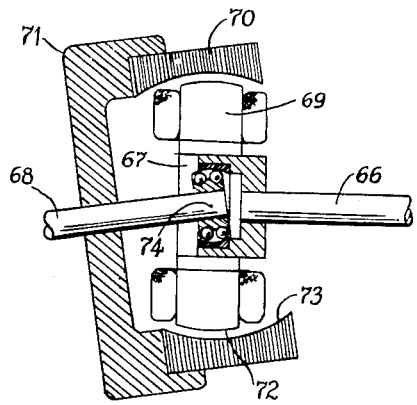
Fig. 12 is a longitudinal sectional view of another machine constituting a modification of that shown in Figs. 3 and 4.

Fig. 12 illustrates diagrammatically another embodiment of the invention as applied to a universal joint coupling and variable speed device. Here the driving shaft 66 supports bearing 67 for the inner ends of the shafts 66, 68. It will be observed that bearing 67 merely forms a support for the ends of the shafts 66, 68, and does not transmit any torque. It is constructed to permit shaft 68 to be driven out of line with shaft 66.

A driven member 69 is supported on the shaft 68 and rotates therewith. The construction of this member 69 may be the same as the member 33 described in connection with the preceding figures. Details of the mounting of the rings necessary to supply current to the windings of member 69 will be observed from the preceding figures and are omitted from Fig. 12.

A ring 70 of laminations constructed substantially the same as the ring 37 shown in Figs. 3, 4 and 5 is supported in a spider or framework 71, mounted to rotate with shaft 68. This ring therefore constitutes the driven member of the transmission.

It will be noted however, that either of the shafts 66 or 68 may be the driving shaft or that the position of members 69 and 70 may be reversed without affecting the operation of the device. Bearings for shafts 66, 68 may be applied thereto and are not shown in Fig. 12.

From what has been said respecting the torque-relationship of the driving and driven members in Figs. 3 and 4, it will be evident how the device shown in Fig. 12 operates with the shafts 66, 68 out of axial alignment, as the opposed faces 72, 73 on these members are of arcuate formation to permit them to move radially about the center 74 of the bearing 67.

Steel to be used in practicing this invention

The foregoing examples of construction as shown in Figs. 3–5 and 7–12 inclusive are merely illustrative of different embodiments of the inventive concept herein disclosed, but it will be observed that all of these embodiments include a laminated steel ring such as that shown at 37, Figs. 3–5.

As has been previously pointed out herein, while prior art devices have had rotating parts of steel such as permanent magnets and the like, and whereas in connection with eddy current transmission the word "steel" has sometimes been used, to describe material used in one of the members in the transmission, it will be apparent from the foregoing description of the prior art devices, that, particularly in the case of the eddy current transmissions, steel, when used, did not have the characteristics necessary to produce maximum hysteresis.

Figure 13:
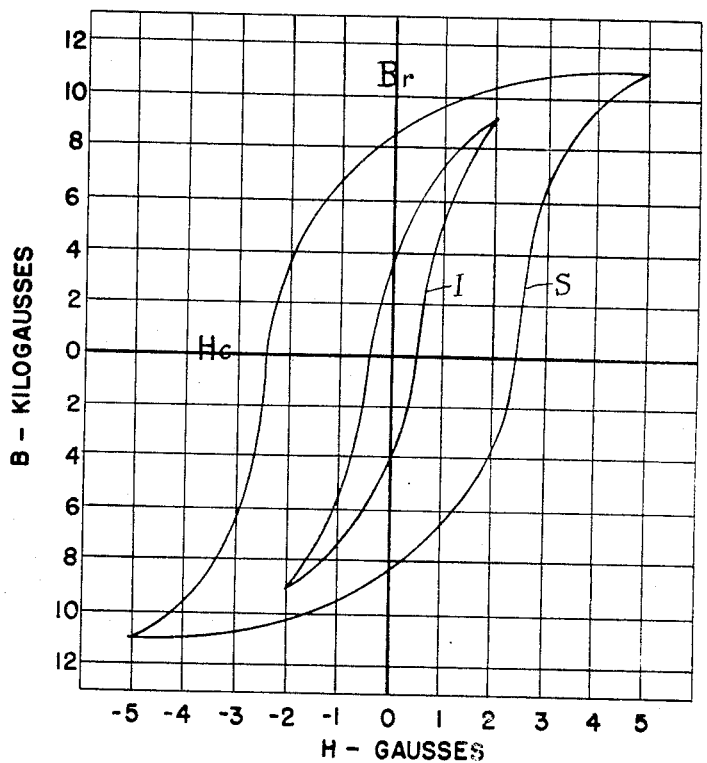
Fig. 13 is a hysteresis curve illustrating the method of selecting steel for use in any of the machines embodying the invention herein disclosed.

Now, referring to Fig. 13, wherein is shown a typical hysteresis curve for a suitable steel at S and a curve for soft iron at I, it may be said in general, that a steel with which to practice this invention should be selected in which the area of the hysteresis loop is as great as possible. This is attained by increasing the carbon content of the steel or by the addition of sulphur, or both. In some steels the carbon content may be brought up to 1.5%. Another factor is the heat treatment-tempering, etc., given the steel.

It is not desirable to use silicon steel which has low hysteresis. Such steel is very much like ingot iron, as far as hysteresis is concerned. In fact, it may be stated that the steels used to practice the invention herein disclosed, have characteristics which are the reverse of the "steels" commonly used in the construction of prior art devices.

As an example of a suitable steel that may be used in the construction of a device as herein disclosed, reference is made to S. A. E. steel number 1040, having characteristics as defined in the Society of Automotive Engineers Handbook, 1946 edition, which also gives the necessary data renormalizing, annealing, hardening, tempering, etc. This is a medium carbon steel possessing fair machining properties, and having deep hardening characteristics, and is readily obtainable commercially. It may be hardened at 1525–1575° F. in oil or water to the desired hardness.

With machines of higher capacity it might be advisable to have a cobalt steel corresponding to $Fe_2Co$ with 34.5 cobalt.

It will be understood that the exact steel used for a machine of any given dimensions will depend somewhat on machine dimensions, taking into consideration the problem of machining (punching or the like), but that satisfactory results will be obtained if the general rule applied to Fig. 13 be followed, namely, select a steel that can be machined and heat treated to the extent desired to have a hysteresis loop of maximum area.

The nearer the curve approaches the curve I, Fig. 6, the less suitable the material will be for practicing this invention.

*Control systems for the embodiments of the invention herein disclosed*

Figure 14:
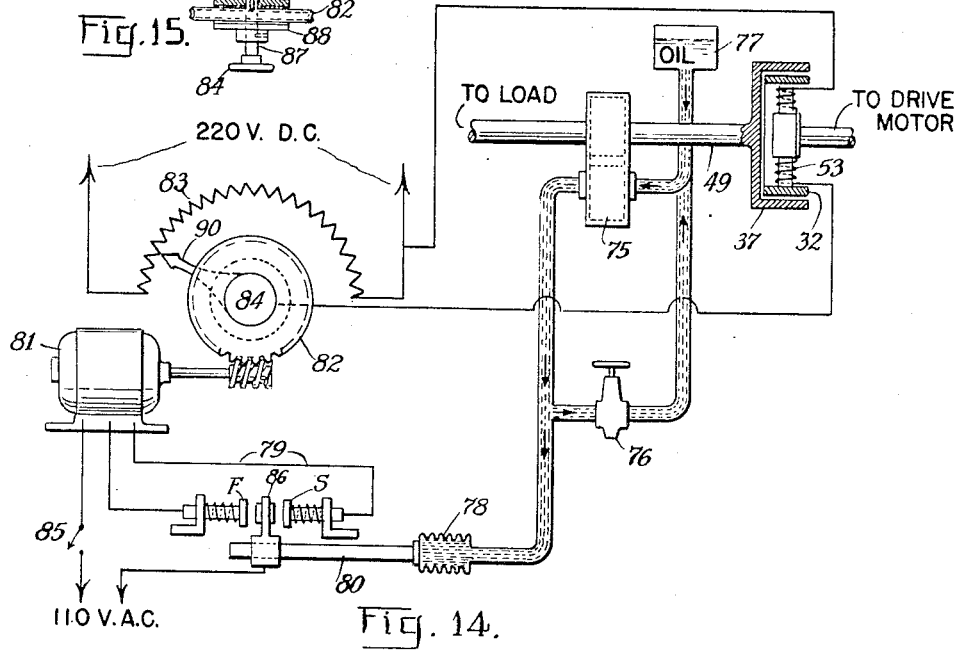
Fig. 14 is a diagram of a control system for maintaining a constant speed of the output shaft of a machine as shown in Fig. 9 under varying loads.

Fig. 14 is a diagram of a control circuit for maintaining a constant output speed for shaft 49 of the transmission shown in Fig. 9. In Fig. 14 the numeral 75 denotes diagrammatically a self contained gear pump; 76 is a by-pass valve; 77 is an oil reservoir, 78 a sylphon bellows or other member adapted to expand and contract, depending upon the pressure of the operating liquid; 79 generally indicates a contact assembly having a movable arm 80 connected to the sylphon bellows.

A reversible motor is shown at 81 driving a worm and gear assembly 82, which operates the movable arm of the potentiometer 83, which has a control knob 84. The potentiometer is connected to a source of D. C. as shown. A switch 85 is connected between the A. C. current supply and the motor 81 as shown.

The apparatus is connected up in a manner that will be obvious from the diagram and in operation control knob 84 is adjusted to supply the proper current from the D. C. current supply to excite the magnet coils 53 of the driving member 32, which, as has been previously described, produces a hysteresis condition in the driven member 37 to cause the output shaft 49 of the transmission connected thereto, to run at the desired speed under load. The by-pass valve 76 is now adjusted so that when the shaft 49 is running at the desired speed, the gear pump 75 will supply enough oil pressure to the sylphon bellow 78 to distend the same about half its length. The surplus oil in the system returns to the reservoir 77 in a manner that will be obvious. The movable contact 86, carried by the arm 80, connected to the bellows, is now adjusted so that it will be mid-way between the contacts F and S of the contact assembly 79.

Switch 85 is now closed. Now, if the load on the output shaft 49 is increased, the speed of said shaft will decrease, and consequently the gear pump 75 connected thereto will supply less oil pressure to the bellows 78, which in turn will operate arm 80 and cause the contact 86 thereon to make contact with the contact S of the contact assembly 79. This closes the circuit through motor 81, and said motor operates to move the arm of the potentiometer 83 in a direction that will increase the D. C. exciting current flowing through the potentiometer 83 to the coils 53 of the transmission. This increases the hysteresis in the driven member 37 and consequently increases the torque thereof to balance the increased load at the desired speed. When this balanced condition is obtained, the bellows 78 again operates to move the contact 86 into a neutral position as shown, and motor 81 ceases to operate.

If the load of the shaft 49 is reduced, then the bellows 78 is expanded, contact 86 operated thereby will engage contact F of the contact assembly 79, and the motor 81 will operate in the opposite direction to that just described to move the potentiometer 83 to reduce the excitation current applied to the coils 53. This causes a reduction in the hysteresis in member 37 of the transmission, with a consequent reduction in torque, and the conditions now obtained are the reverse of those described in connection with the application of an increased load.

Figure 15:
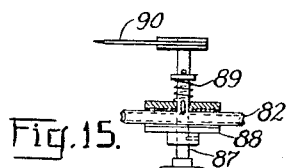
Fig. 15 is a sectional view of the worm gear potentiometer in the control system Fig. 14.

Fig. 15 is a sectional view of the worm gear potentiometer 83, Fig. 14, and in Fig. 15 a control knob 84 is rigidly secured to a shaft 87. The worm gear assembly 82 is loosely mounted about this shaft, and is pressed against a collar 88 thereon by means of a flange and spring shown at 89, in such a manner that any motion imparted to the worm gear will be imparted to shaft 87 through the frictional engagement of the flange and gear. This permits the potentiometer to be controlled by hand through the control knob 84, or controlled automatically through the worm and gear 82. It will be understood that the moving contact 90 of the potentiometer is rigidly secured to the shaft 87.

Figure 16:
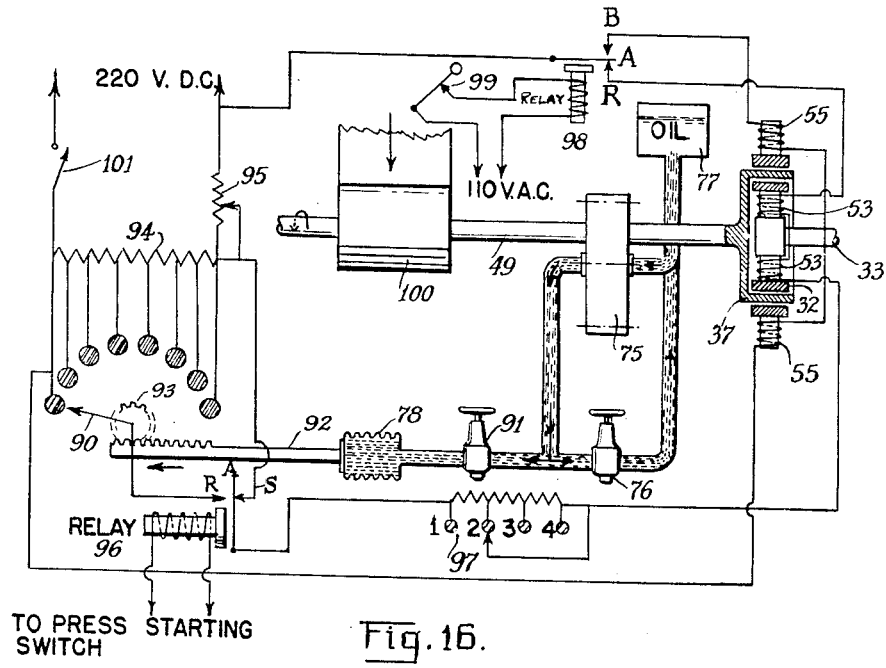
Fig. 16 is a diagram of a control system for maintaining a constant H. P. output from a machine such as that shown in Figs. 7 and 8.

In Fig. 16 is shown a control circuit for maintaining a constant horsepower output from the device shown in Figs. 7 and 8, and is particularly useful when applying such a transmission device to the rewind of a printing press or the like. In Fig. 16, the numeral 75 indicates a gear pump; 76 a by-pass valve; 91 a speed range valve; 77 an oil reservoir; 78 a sylphon bellows. Numeral 92 is a toothed rack adapted to be moved by the operation of said bellows and engaging a pinion 93 which is secured to the movable arm 90 of the potentiometer 94. Numeral 97 is a rheostat and 98 is a relay having an armature contact A and fixed contacts B and R. Numeral 99 indicates a switch having an arm which engages the paper web 100, said switch being held open when the web is in proper position, and said switch being closed if the web should break.

In a web printing press, the web after being printed is rewound on a core about 3 or 4 inches in diameter. It is necessary that the web in being rewound, should always having the same tension in order to maintain register between successive colors applied to the web in printing thereon. If the press were run to move the web at the rate of 500 lineal feet per minute, and the rewind core had a circumference of 12 inches, then the rewind shaft 49 which drives the web core should rotate 500 R. P. M. Now, as the diameter of the rewind core builds up as the web is wound thereon, say to a circumference of 24-inches, the shaft 49 should run at only 250 R. P. M., etc.

The ratio between the core diameter and full roll diameter is often 10 to 1 or better, so that in the above case, if the circumference of the roll is increased to 120″, then the speed of rotation would be 50 R. P. M.

In order to maintain a constant tension on the web, it becomes obvious that if the speed of the rewind shaft is halved, the torque applied thereto must double to give the same web tension. To have the torque double as the speed halves is a necessary condition to obtain constant horsepower.

Referring to Fig. 16, and the application of the invention to a rewind, the first step is to "thread" the web through a printing press and secure the end of the web 100 to the winding core on shaft 49. This brings the web against the arm of switch 99 which is in consequence opened.

The prime mover, such as a motor (not shown) being connected to the driving shaft 33 of the torque transmitter, switch 101 is closed, thus energizing the coils 53 of the torque transmitter in the previously described manner.

The relay 96 is not energized, and consequently the armature A is resting against contact S thereof, thus supplying the coils 53 with a minimum amount of current through rheostat 95, thus producing a small tension in the web.

When the press starting switch (not shown) is operated, relay 96 is energized and armature contact A thereof completes the circuit through contact R thereof. This immediately, by reason of the position of the rheostat arm 90, permits a maximum current to flow to the coils 53, which accordingly produce hysteresis in the driven member 37 of the transmission as previously described, which accelerates the shaft 49. As this shaft increases in speed, the gear pump 75 supplies (with valve 76 in proper setting) sufficient oil to the bellows 78 to cause rack 92 and gear 93 to move the contact arm 90 of the potentiometer 94 to furnish the precise amount of current necessary for the coils 53 to create sufficient torque at the desired speed.

As the diameter of the rewind roll of paper 100 increases, and the shaft 49 as a result begins to rotate slower, the gear pump 75 supplies a lesser amount of oil to the bellows 78, and as the bellows contracts, it moves the rack and pinion 92 and 93 to move the contact arm 90 of the potentiometer 94 to gradually increase the excitation of coils 53, thereby increasing the torque in the transmission proportionally to the reduction in speed of shaft 49.

If the web should break, the arm of switch 99 resting thereon, will move to open the switch, which opens the circuit through relay 98, contact arm A of which then makes contact at B. This completes a circuit from the D. C. sources through the brake coils 55, which magnetically break the rotation of the driven member 37 of the transmission, thereby stopping the web.

A rheostat 97 is included in the circuit as shown, for the purpose of setting up a predetermined tension on the web required for different types of material such as paper board, paper, cellophane, etc., including any other material such as cloth or the like, on which it is desired to maintain a uniform tension when winding.

The speed range valve 91 is used to control the amount of oil entering the bellows 78 and adjust the back pressure which can be varied. For example, if the rewind shaft 49 is to turn between 50 and 500 R. P. M., then the bellows 78 must expand from normal to maximum within this speed range. If the speed range were from 50 to 1000 R. P. M., then valve 91 must be closed a little more than in the previous condition, so that the bellows 78 will expand from normal to maximum for this new speed range.

Figure 17:
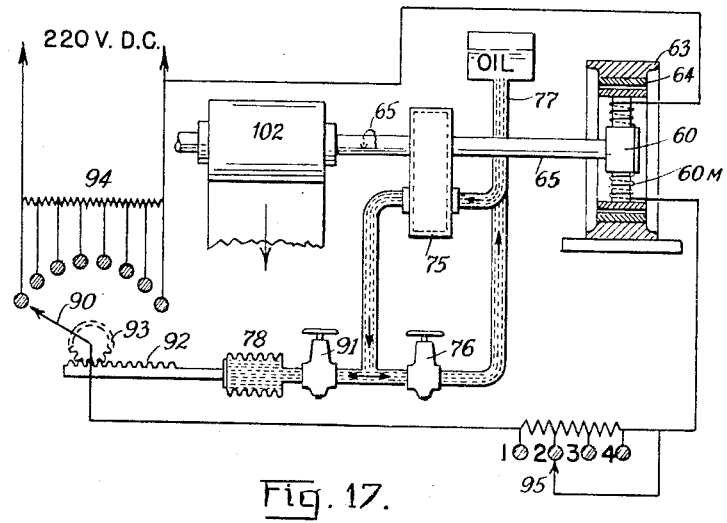
Fig. 17 is a diagram of a control system for maintaining a constant let-off tension on a roll of paper or the like, utilizing the machine shown in Fig. 11.

Fig. 17 illustrates a control system for maintaining a constant let-off tension on a roll of paper or the like, as it is being printed on a printing press. In the drawing, the gear pump by-pass valve, speed range valve, oil reservoir, bellows, rack and pinion, potentiometer and rheostat all operate as described in connection with previous figures.

The roll of paper 102 is mounted on shaft 65 of the device shown in Fig. 11. The object is to feed the roll of paper into the press with a certain degree of hold-back tension. As the roll is unwound, the member 60 is rotated within the stationary ring 64, secured to the frame 63. The coils 60M on the rotating member are excited and therefore hysteresis is set up in the member 64, which produces a torque which acts as a drag or brake on the member 60 of shaft 65 connected thereto. As the roll is unwound, the speed of rotation increases. This increase in speed will cause the pump 75 to work faster and expand the bellows 78, which, through rack and pinion 92 and 93 will move the contact arm 90 of the potentiometer 94, so as to reduce the excitation of coils 60M, thereby maintaining a contant hold-back tension.

It will be understood that the control system shown in Figs. 14–17 are merely descriptive of the control means that may be used with the instant invention, and many other forms of control means may be used that vary excitation current and thereby vary the torque in the device. These figures also serve to illustrate some of the practical uses to which the device can be put.

What is claimed is:

1. In combination with a torque transmitting electrical device having a driving and driven member, one of said members made of high hysteresis loss material and the other of said members having a winding thereof, a shaft connected to said driven member, means for winding a web about said shaft, a web, a switch having an arm adapted to engage said web to hold said switch in open circuit position when the web is in tension and to move to closed circuit position when said tension is released, a circuit including a source of current, a resistance and said winding wherein varying said resistance will vary the amount of current flowing through said winding and thereby vary the hysteresis loss of said device to provide a constant tension on said web, means serially included in said circuit and controlled by said switch for opening said circuit when said switch is opened, a control relay, a circuit controlled by said relay and including said source of current, resistance and winding and having a variable resistance in circuit therewith, and means controlled by the rotation of said driven shaft for altering the value of said variable resistance and thereby changing the magnetism of said device to alter the torque therein to maintain said constant tension on said web independent of the load applied to said shaft as the web increases in size as wound.

2. The combination as claimed in claim 1, wherein said electrical device includes brake coils adjacent the periphery of that member of the device made of high hysteresis loss material, and wherein said brake coils are serially included in a circuit including said switch and said source of current.

3. The combination as claimed in claim 1, wherein said last means includes a fluid operated device connected to said shaft and wherein said variable resistance includes an arm operated by said means.

4. The combination as claimed in claim 1, wherein said last means controlled by the rotation of said driven shaft includes a pump, a fluid reservoir connected to said pump, an expansible and contractible bellows connected to said pump, a by-pass valve between the outlet and inlet sides of said pump and a valve between said pump and said bellows.

5. The combination as claimed in claim 1, wherein said variable resistance has a rotary arm, a shaft for said arm, a gear loosely mounted on said shaft and connected to said motor, and friction means between said gear and shaft whereby said shaft may be manually adjusted independently of the position of said gear.

References Cited in the file of this patent
UNITED STATES PATENTS

| | | |
|---|---|---|
| 704,574 | Pintsch | July 15, 1902 |
| 1,862,267 | Honig | June 7, 1932 |
| 1,982,461 | Winther | Nov. 27, 1934 |
| 2,070,447 | Morrill | Feb. 9, 1937 |
| 2,317,290 | McIlvried | Apr. 20, 1943 |
| 2,583,523 | Winther | Jan. 22, 1952 |

FOREIGN PATENTS

| | | |
|---|---|---|
| 18,279 | Australia | of 1934 |
| 356,945 | Great Britain | Sept. 17, 1931 |

OTHER REFERENCES

"Experimental Elec. Engineering," Karapetoff, vol. 1, second edition, published in 1910, by John Wiley and Sons, New York City, page 190 to 195.